Oct. 21, 1930.  G. H. STONER  1,779,197
BRAKE
Filed Oct. 20, 1928  2 Sheets-Sheet 1
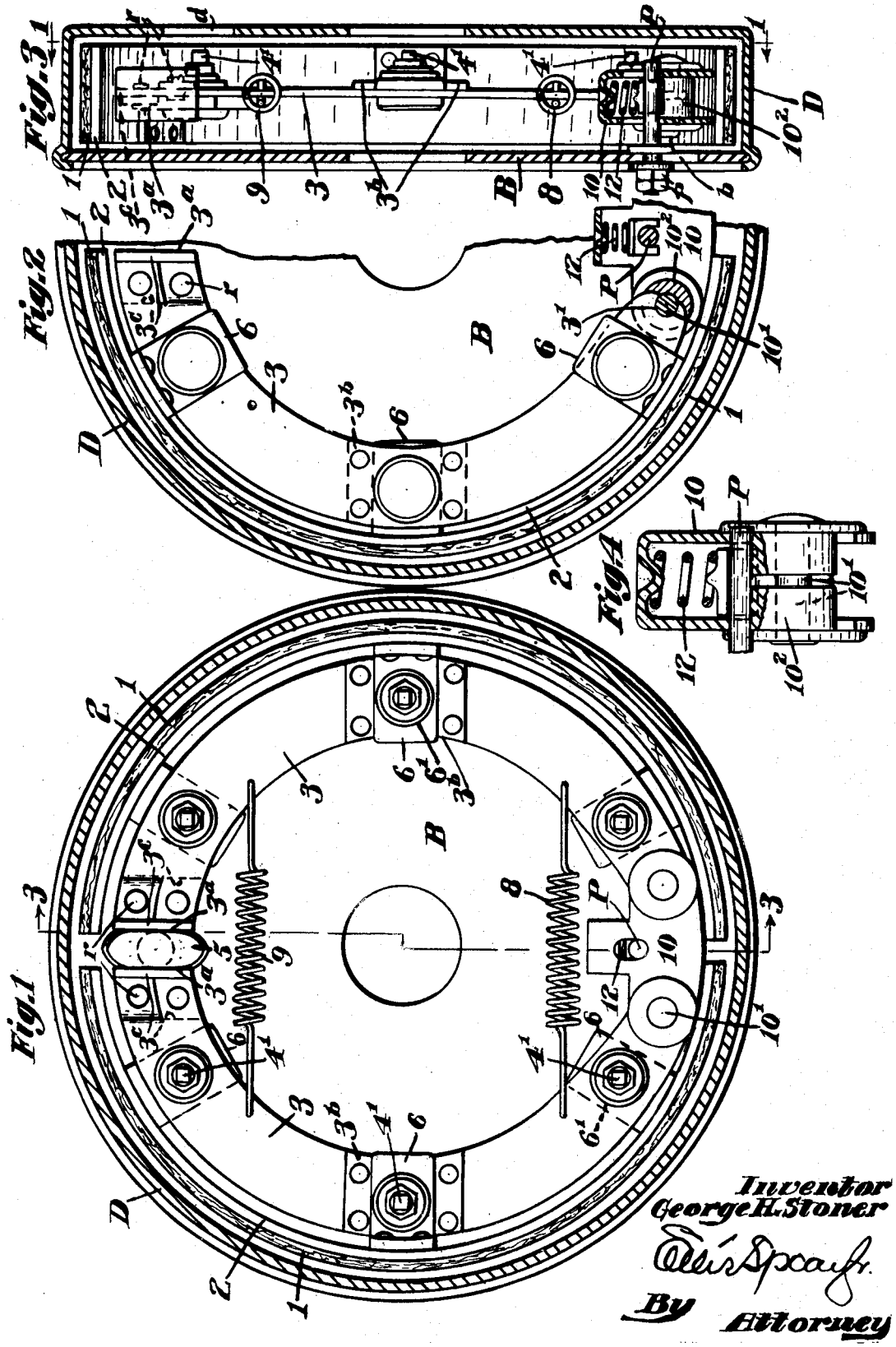
Inventor
George H. Stoner
By Attorney

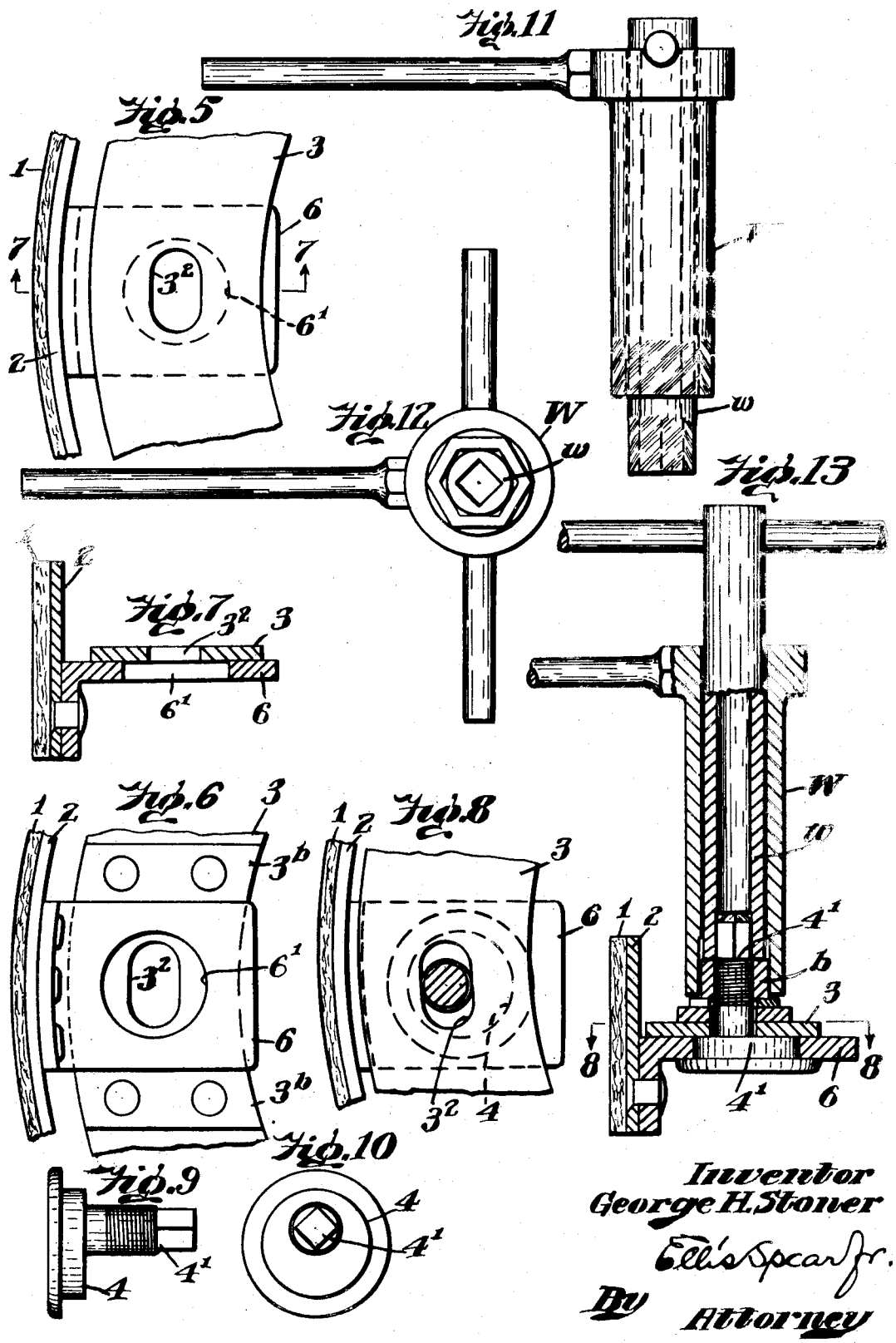

Patented Oct. 21, 1930

1,779,197

UNITED STATES PATENT OFFICE

GEORGE H. STONER, OF EAST BOSTON, MASSACHUSETTS, ASSIGNOR, BY MESNE ASSIGNMENTS, TO STONER-AMES BRAKE COMPANY, INC., OF BOSTON, MASSACHUSETTS, A CORPORATION OF MASSACHUSETTS

BRAKE

Application filed October 20, 1928. Serial No. 313,914.

The improvements herein presented relate to internal expansion members for brakes and the like, and the embodiment shown follows generally the principles of my prior application Serial No. 219,591, filed September 15, 1927. There are also involved the principles of my prior inventions set forth in my Letters Patent Nos. 1,550,398 and Reissue No. 16,484, which are combined with new concepts to attain certain new results.

The embodiment shown while generally illustrative and not to be considered as limiting does represent a structural improvement of high efficiency and general adaptability and one capable of that production so necessary in the automotive industry.

Fig. 1 is a face view of a brake with its drum back cut off.

Fig. 2 shows a half brake installation viewed from the opposite side with pivot block sectioned.

Fig. 3 is a section on the indicated line 3—3, of Fig. 1.

Fig. 4 is a fragmentary detail transversely of the anchor pin rider.

Fig. 5 is a fragmentary detail illustrating the relative adjustor bearings between the shoe members.

Fig. 6 is an opposite view of the same.

Fig. 7 is a section on the indicated line 7—7, of Fig. 5.

Fig. 8 supplements Fig. 5 as indicating the adjustor eccentric.

Fig. 9 is a side elevation of the adjustor cam and stem.

Fig. 10 an end view of the same.

Figs. 11, and 12, are side and plan views of the adjustor wrench, and

Fig. 13 a section through the wrench and adjustor section of the brake members.

Referring to these drawings as a basis of discussing my invention, I have indicated in Fig. 1, a brake drum D of conventional type. Within this the internal expansion members are shown as supported on a usual anchor pin P in such a way as to make possible a self centering of these members in the drum as well as a movement for complete contact upon expansion.

The internal expansion members comprise a primary shoe 2 having a lining 1 which shoe as shown is a flexible or deformable strip bent to a segment of approximately the radius of the drum D.

Within each primary shoe 2 is a rigid secondary shoe 3. These preferably but not at all necessarily are also segmental or of general arcuate form whereby I allow for maximum hub diameters.

Devices according to my invention may be operated by any of the many well known devices. I have shown a cam 5 but this is merely illustrative and shown as a common means in general use. For such a cam I provide wear plates or facings $3^a$ which take the direct wear of the cam 5 against which they are held by the spring 9. The plate $3^a$ may be of hardened steel and thus permit the secondary shoes 3 to be of softer stamping or castings, capable of production at low cost and in quantity. Where the shoe 3 is a metal stamping, as indicated, I preferably form the cheek pieces $3^c$ from T-shaped stock and simply split the ends of the shoe 3 forcing in the web of the cheek piece and riveting it as at $r$.

At their opposite ends the shoes 3 have rounded recesses $3^1$ to receive the pin $10^1$ of the block 10 between the spacers $10^2$. It will therefore be seen that the secondary shoes 3 constitute a pivoted pair which may be opened out by any operating device as by the cam 5 shown. The secondary shoes 3 rock on the block 10 to which they are held in socketed relation by the spring 8 and they have through this block 10 a radial outward movement as well as a pivotal or swinging motion. The block 10 further acts as a following block for the adjacent ends of the primary shoe members 2 against which the block presses when the cam 5 is operated. A fixed radial adjustment is provided through the locating of the anchor pin P in a slot $b$ in the backing plate B, it being held by suitable nuts $p$. This provides for the centering of the expansion members in the drum.

In such a structure adjustment of curvature is effected by varying the relation of the flexible or deformable member 2 to the member 3. In the form shown this adjustment is effected by the rotation of an eccentric 4 which has a circular bearing in radial bracket members 6 which may be riveted in suitable spacing along the flexible band 2. I have shown such brackets at the center and adjacent the two ends of the shoe members so as to control the flexible shoe 2 as a whole or to flex the middle or either of both ends as desired. The eccentric member 4 has a stem $4^1$ squared off to receive an adjusting extension and has bearing in the secondary shoe member 3. As shown, access to the stems $4^1$ is had through the opening $d$ in the drum D. If access is desired through the backing plate B the dispositions of the stems is reversed. The bearing $3^2$ is an elongated slot to permit the movement of the parts affected by the rotation of the eccentric 4 which bears in the opening $6^1$ of the bracket 6. The construction and arrangement of these brackets and bearings may be best seen in Figs. 6, 8 and 13. This latter figure shows partly in section the extension member which consists of a tubular outer member W adapted to fit over the lock nut $p$ and hold it against rotation after having been loosened while the inner member $w$ is engaged with the end of the stem $4^1$ to turn the eccentric 4. The bracket members 6 slide generally radially and may be laterally guided by plates or guides $3^b$ suitably secured to the secondary shoes 3 and engaging edges of the brackets 6.

While I have referred to my primary shoe member as flexible or deformable, and while that aspect of it is of great importance, it has certain other advantages and combinational functions apart from flexibility or deformability.

One of the advantages of the primary strip or shoe is that of its convenience as a lining carrying member and its capacity for radiation of the heat developed by the friction with the drum. Furthermore, the primary shoe whether it be flexible or more or less rigid makes it possible to extend the lining carrying surface of the brake beyond the support of the secondary shoe so that the contact surface of each expansion member can be extended to practically half the circumference of the drum. Here again comes in another important advantage in that through the combinative relation of the radially movable hinge block or anchor pin rider, the underlying free ends of the primary shoe are pressed by the hinge block or rider firmly against the drum when the members are expanded. It will be noted that in its function as a lining carrying member the primary shoe affords great convenience in case it should be desired to reline. Owing to the low cost of the primary shoe replacement, shoes with new lining can be furnished at low cost and can be substituted quickly and without trouble by a mere removal of the old primary shoe, and the substitution of a new shoe with a fresh lining.

From the foregoing and a consideration of the structures involved, it will be readily seen that my expansion members are capable of movement into contact with the drum with a substantial uniformity of pressure throughout. This matter of uniformity of contact and pressure and that too over substantially the entire inner surface of the shoe, gives the brake the highest efficiency and subjects the lining to a minimum of destructive wear. As heretofore pointed out, the matter of uniformity of wear on the lining is a matter of the greatest importance. As soon as a lining begins to wear in any one spot, its period of usefulness is materially shortened. If a lining can be maintained so that its wear is uniform its usefulness continues until it is worn out or so far worn out that its rivets do not hold. This is the result actually obtained in the operation of my brake. Linings have been run under the most exacting conditions for periods far in excess of the supposed life of a lining through the very efficiency of the uniform contact made possible by my brake.

In this connection it will also be noted that by reason of the rocking function of the hinge block on the anchor pin the expansion members have what may be termed a universal action; that is, a compensating action. By reason of this if the original adjustment of curvature was incorrect or that adjustment should be distributed so that one shoe had a slightly less clearance in the drum than did the other, the compensating action of the brake when the drum is rotated and the brake applied permits each shoe to find the drum regardless of the discrepancy in clearance. Furthermore, as will be noted, the functions of the brake hold true both in going ahead and in backing up so that the brake energizes in either direction of the rotation of the wheel.

The elements and their various combinations may be shifted. The design of the parts may be changed to meet various individual car requirements and the embodiment may be for all the other uses in which internal expansion members may be utilized.

What I therefore claim and desire to secure by Letters Patent is:—

1. In an internal expansion brake, a pair of expansion members each including an inner rigid operating member and a relatively thin lining carrying member supported on the operating member in spaced relation thereon, and a radially yieldable hinge block for the operating shoes, said lining member being extended beneath the hinge block so as to be contactable thereby.

2. In an internal expansion brake, a pair of expansion members each including an inner rigid operating member and a radially yieldable hinge block for the operating shoes, said lining member being extended beneath the hinge block so as to be contactable thereby.

3. A shoe member for an internal expansion device comprising a primary deformable contact member and a substantially non-deformable member, and connections at a plurality of spaced points for maintaining said members in a predetermined relation, at least one of said connections being adjustable to change the relative positions of said members.

4. A shoe member for an internal expansion device comprising a primary deformable contact member and a substantially non-deformable arc-shaped backing member, and connections securing said members together at a plurality of spaced points, at least one of said connections being adjustable and located adjacent one end of said deformable member whereby the curvature of said member may be varied.

5. A shoe member for an internal expansion device comprising a primary deformable contact member and a substantially non-deformable arc-shaped backing member, and connections securing said members together at a plurality of spaced points, at least two of said connections being adjustable and located adjacent one end and at an intermediate point of said deformable member whereby the curvature of said member may be varied.

6. A shoe member for an internal expansion device comprising a primary deformable contact member and a substantially non-deformable member, and connections at a plurality of spaced points for maintaining said members in a predetermined relation, at least one of said connections including a rotatable member having eccentric portions one of which is operatively associated with said deformable contact member and the other operatively associated with the non-deformable member.

7. A shoe member for an internal expansion device comprising a primary deformable contact member and a substantially non-deformable member, connections at a plurality of spaced points for maintaining said members in a predetermined relation, at least one of said connections including a rotatable member having eccentric portions one of which is operatively associated with said deformable contact member and the other operatively associated with the non-deformable member, and means for locking said rotatable member to said other members.

8. A shoe member for an internal expansion device comprising a primary deformable contact member and a substantially non-deformable arc-shaped backing member, connections securing said members together at a plurality of spaced points, at least one of said connections including a bracket secured to said contact member and extending adjacent the other member, and a rotatable member having eccentric portions one of which has a bearing in said bracket and the other a bearing in said non-deformable member.

9. In an internal expansion brake, a stationary backing plate, a pair of expansion members each including a deformable contact member supported by a substantially non-deformable member, a radially yieldable hinge block connecting said expansion members and adjustably mounted on said backing plate, and means for adjusting the curvature of said deformable member.

In testimony whereof I affix my signature.
GEORGE H. STONER.